2,994,637
AMINOPYRIMIDINES AS FUNGICIDES

Russell M. Bimber, Painesville, Ohio, assignor to Diamond Alkali Company, Cleveland, Ohio, a corporation of Delaware
No Drawing. Filed Nov. 13, 1957, Ser. No. 696,057
3 Claims. (Cl. 167—33)

This invention relates to compounds of the structure:

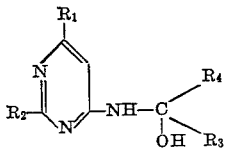

wherein $R_1$, $R_2$, $R_3$, and $R_4$ are selected from the group consisting of hydrogen atoms, alkyl radicals, such as methyl, ethyl, propyl, butyl, and the like; aryl radicals, such as phenyl radicals; aralkyl radicals, such as phenyl-substituted methyl radicals; alkaryl radicals, such as tolyl and xylyl radicals; and substituted derivatives of the same, the preferred substituents being halogens, i.e., fluorine, chlorine, bromine and iodine, chlorine being preferred; and the method of preparing and using the foregoing.

More specifically, this invention deals with compounds of the structure:

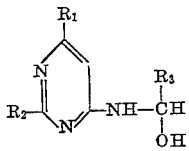

wherein $R_1$, $R_2$, and $R_3$ are selected from the group consisting of hydrogen atoms, alkyl radicals, aryl radicals, aralkyl radicals, alkaryl radicals, and substituted derivatives of the same, especially halogen-substituted derivatives of the foregoing, i.e., chlorine, fluorine, bromine, and iodine-substituted derivatives, preferably being selected from the group consisting of alkyl radicals and halo alkyl radicals, such as trichloromethyl, 1,1,2-trichloropropyl, tribromomethyl, 1-chloropropyl, and 1-chloroethyl.

Still more specifically, this invention deals with compounds of the structure:

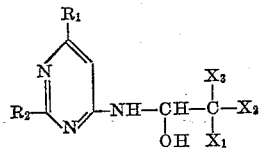

wherein $R_1$ and $R_2$ are selected from the group consisting of hydrogen atoms, alkyl radicals, aralkyl radicals, alkaryl radicals, aryl radicals, and substituted derivatives of the same; and $X_1$, $X_2$, and $X_3$ are selected from the group consisting of halogen atoms and hydrogen atoms, at least one of which is halogen.

Compounds of the invention generally are prepared by reacting a compound of the structure:

(I)

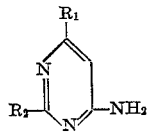

with a compound of the structure:

(II)

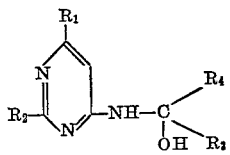

resulting in a compound of the structure:

(III)

wherein $R_1$, $R_2$, $R_3$, and $R_4$ are selected from the group consisting of hydrogen atoms, alkyl radicals, aryl radicals, aralkyl radicals, alkaryl radicals, and substituted derivatives of the same, especially halogen-substituted derivatives.

More specifically, the process of this invention is carried out by reacting the above Compound I with an aldehyde, preferably chloral, in approximately equi-molar amounts. In some instances the reaction may be more easily effected by bringing the two reactants together in the presence of a solvent, such as benzene, chloroform, heptane, and trichlorobenzene. Typically the combination is exothermic and needs no great amount of energy to initiate reaction. Illustrative of Compound I are 4-amino-2,6-dimethylpyrimidine, 4-amino-2-phenyl-6-methylpyrimidine, 4-amino-2,6-diethylpyrimidine and 4-aminopyrimidine.

In each of the above specific preparations, the reaction conditions are such that cooling is desirable while combination occurs. Reaction temperature is preferably kept below the reflux temperature of the aldehyde. Typically, the reaction product is purified, preferably through trituration and washing with an organic solvent, such as chloroform, benzene, and carbon tetrachloride.

The compounds of this invention are useful in the fields of pharmaceuticals, chemical intermediates, and also show biological activity, usch as the control of microorganism growth, e.g., the protection of tomato foliage against blight fungi, and the inhibition of spore germination.

While compounds of this invention may be employed in a variety of applications, it will be understood, of course, that such compounds may be utilized in diverse formulations, both solid, including finely-divided powder and granular material, and liquid, such as solutions, concentrates, slurries, emulsifiable concentrates, and the like, depending upon the application intended and the formulation media desired.

Thus, it will be appreciated that compounds of this invention may be employed to form biologically active substances containing such compounds as essential active ingredients thereof, which compositions may also include finely-divided dry or liquid diluents, extenders, fillers, conditioners, including various clays, diatomaceous earth, talc, spent catalyst, alumina silica materials, and incorporating liquid solvents, diluents, etc., typically, water and various organic liquids, such as kerosene, benzene, toluene, and other petroleum distillate fractions or mixtures thereof.

When liquid formulations are employed, or dry materials prepared which are to be used in liquid form, it is desirable in certain instances additionally to employ a wetting, emulsifying or dispersing agent to facilitate use of the formulation, e.g., Triton X-155 (alkyl aryl polyether alcohol, U.S. Patent 2,504,064).

The term "carrier" as employed in the specification and claims is intended to refer broadly to the materials constituting a major proportion of a biologically active or other formulation and hence, includes finely-divided materials, both liquids and solids, as aforementioned, conventionally used in such applications.

In order that those skilled in the art may more completely understand the present invention and the preferred methods by which the same may be carried into effect, the following specific example is offered.

EXAMLPE I.—PART A

*Preparation of 2,6-dimethyl-4-(2,2,2-trichloro-1-hydroxyethyl)-aminopyrimidine*

36.9 gm. (0.3 mol) of 4-amino-2,6-dimethylpyrimidine is dissolved in about 400 ml. of benzene. 32 ml. (0.32 mol) chloral is added portionwise. An exothermic reaction occurs, and therefore cooling is employed while chemical combination occurs. Upon completion of reaction, purification of the product is carried out through filtering, washing with benzene, and drying for 2 hours at 50° C. The product has a melting point range of 162°–168° C., and weighs about 82 gm. The material is triturated with 100 ml. of chloroform followed by filtering, and washing with three 25 ml. portions of chloroform. 78 gm. of white $C_8H_{10}Cl_3N_3O$ melting at 160°–162° C. results. The following elemental analysis indicates the desired product is obtained:

| Element | Actual, Percent by Wgt. | Calculated, Percent by Wgt. |
|---|---|---|
| C | 35.90 | 35.6 |
| H | 3.64 | 3.73 |
| N | 15.53 | 15.5 |

EXAMPLE I.—PART B

The following tests demonstrate biological activity of the product of Part A:

Spore germination tests on glass slides are conducted by the test tube dilution method adopted from the procedure recommended by the American Phytopathological Society's Committee on Standardization of Fungicidal Tests. In this procedure the product of Part A in aqueous formulations at concentrations of 1000, 100, 10, and 1.0 p.p.m. is tested for its ability to inhibit germination of spores from 7–10 day old cultures of *Alternaria oleracea* and *Monilinia fructicola*. These concentrations refer to initial concentrations before diluting 4 volumes with 1 volume of spore stimulant and spore suspension. Germination records are taken after 20 hours of incubation at 22° C. by counting 100 spores. Using this procedure the product from Part A inhibits germination of half the spores (E.D. 50 value) at a concentration between 100 and 1000 p.p.m. for the *M. fructicola* and at about 1000 p.p.m. for the *A. oleracea*.

EXAMPLE I.—PART C

Further, a tomato foliage disease test is conducted measuring the ability of the test compound to protect tomato foliage against infection by the Early blight fungus *Alternaria solani*. Tomato plants 5 to 7" high of the variety Bonny Best are employed. The plants are sprayed with 100 ml. of test formulation at 2000 p.p.m., 400 p.p.m., and 80 p.p.m. test chemical in combination with 5% acetone, 0.01% Triton X–155, and the balance water at 40 pounds air pressure while being rotated on a turntable in a spray chamber. After the spray deposit is dry, the treated plants and comparable untreated controls are sprayed with a spore suspension containing approximately 20,000 conidia of *A. solani* per ml. The plants are held at 100% humidity for 24 hours at 70° F. to permit spore germination and infection. After 2 to 4 days, lesion counts are made on the three uppermost fully expanded leaves. Data based on the number of lesions obtained on the control plants shows significant disease control at each of the concentrations.

It is to be understood that although the invention has been described with specific reference to particular embodiments thereof, it is not to be so limited, since changes and alterations therein may be made which are within the full intended scope of this invention as defined by the appended claims.

What is claimed is:

1. The method of controlling fungus growth which comprises contacting said fungi with a toxic amount of a compound of the structure:

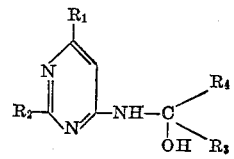

wherein $R_1$, $R_2$, $R_3$ and $R_4$ are selected from the group consisting of hydrogen atoms, lower alkyl radicals, phenyl radicals, phenyl-substituted methyl radicals, tolyl and xylyl radicals, and halogen-substituted derivatives of the same.

2. The method of controlling fungus growth which comprises contacting said fungi with a toxic amount of 2,6-dimethyl-4-(2,2,2-trichloro-1-hydroxyethyl) aminopyrimidine.

3. The method of killing microorganisms which comprises contacting said microorganisms with a toxic amount of 2,6-dimethyl-4-(2,2,2-trichloro-1-hydroxyethyl) aminopyrimidine.

References Cited in the file of this patent

UNITED STATES PATENTS 2,487,569     Mackey     Nov. 8, 1949

OTHER REFERENCES

Wertheim: Textbook of Organic Chemistry (second edition), page 142 (1945).

Nelson et al.: Jour. Amer. Pharm. Assoc., vol. 36, pages 349–352 (1947).

Goldberg: Bull. Soc. Chim. (France), pages 895–899 (1951).